(12) United States Patent
Ritter

(10) Patent No.: US 11,927,302 B2
(45) Date of Patent: Mar. 12, 2024

(54) FASTENER

(71) Applicant: Spectra Precision (Kaiserslautern) GmbH, Kaiserslautern (DE)

(72) Inventor: Christian Ritter, Ludwigshafen (DE)

(73) Assignee: Spectra Precision (Kaiserslautern) GmbH, Lisle, IL (US)

( * ) Notice: Subject to any disclaimer, the term of this patent is extended or adjusted under 35 U.S.C. 154(b) by 0 days.

(21) Appl. No.: 17/444,743

(22) Filed: Aug. 9, 2021

(65) Prior Publication Data

US 2022/0120378 A1    Apr. 21, 2022

(30) Foreign Application Priority Data

Oct. 20, 2020  (DE) .......................... 102020213222.4

(51) Int. Cl.
| | |
|---|---|
| *F16M 13/02* | (2006.01) |
| *F16B 2/06* | (2006.01) |
| *F16M 11/04* | (2006.01) |
| *G01C 9/06* | (2006.01) |

(Continued)

(52) U.S. Cl.
CPC .......... *F16M 13/022* (2013.01); *F16B 2/065* (2013.01); *G01C 9/06* (2013.01); *F16M 11/041* (2013.01); *F16M 11/06* (2013.01); *F16M 2200/022* (2013.01); *F16M 2200/024* (2013.01); *G01C 2009/066* (2013.01); *G01C 15/00* (2013.01)

(58) Field of Classification Search
CPC .......... F16M 13/022; F16M 2200/022; F16M 2200/024; F16M 11/041; F16M 11/06; F16B 2/065; G01C 9/06; G01C 2009/066; G01C 15/00
See application file for complete search history.

(56) References Cited

U.S. PATENT DOCUMENTS 5,842,671 A * 12/1998 Gibbs ................ F16M 11/2014
                                                            248/311.2
5,996,957 A * 12/1999 Kurtz ................ A47G 23/0225
                                                            248/231.21

(Continued)

FOREIGN PATENT DOCUMENTS

DE    202014100454 U1 *  5/2014  .......... G01C 15/006

*Primary Examiner* — Tan Le
(74) *Attorney, Agent, or Firm* — Polsinelli PC

(57) ABSTRACT

A fastener comprises a body part, fastening means for fixing the fastener to a first object, a mounting part for mounting a second object to the fastener, and connecting means connecting the body part and the mounting part. The mounting part is rotatable and pivotable relative to the body part so as to assume a predetermined orientation relative to the body part, and the body part is retractable from the mounting part. The fastener is adjustable between at least two operational states, a first operational state, in which the body part and the mounting part are adjacent to each other, or a second operational state, in which the body part is retracted from the mounting part so that the body part and the mounting part are spaced apart from each other. In the first operational state, the predetermined orientation of the mounting part relative to the body part is fixed, and in the second operational state, the predetermined orientation of the mounting part relative to the body part is adjustable by rotating and/or pivoting the mounting part.

19 Claims, 13 Drawing Sheets

(51) Int. Cl.
*F16M 11/06* (2006.01)
*G01C 15/00* (2006.01)

(56) References Cited

U.S. PATENT DOCUMENTS

| | | | |
|---|---|---|---|
| 6,398,175 B1* | 6/2002 | Conner | B25B 1/2405 |
| | | | 248/228.3 |
| 6,438,854 B1* | 8/2002 | Kott, Jr. | B25B 5/068 |
| | | | 33/286 |
| 7,414,704 B1* | 8/2008 | Nau | G01C 15/006 |
| | | | 356/4.08 |
| 7,448,138 B1 | 11/2008 | Vanneman | |
| 2007/0045493 A1* | 3/2007 | Somji | F16M 13/00 |
| | | | 248/229.14 |
| 2011/0266425 A1* | 11/2011 | Kallabis | F16M 13/00 |
| | | | 250/239 |
| 2020/0030191 A1* | 1/2020 | Santillan | F16B 2/005 |

* cited by examiner

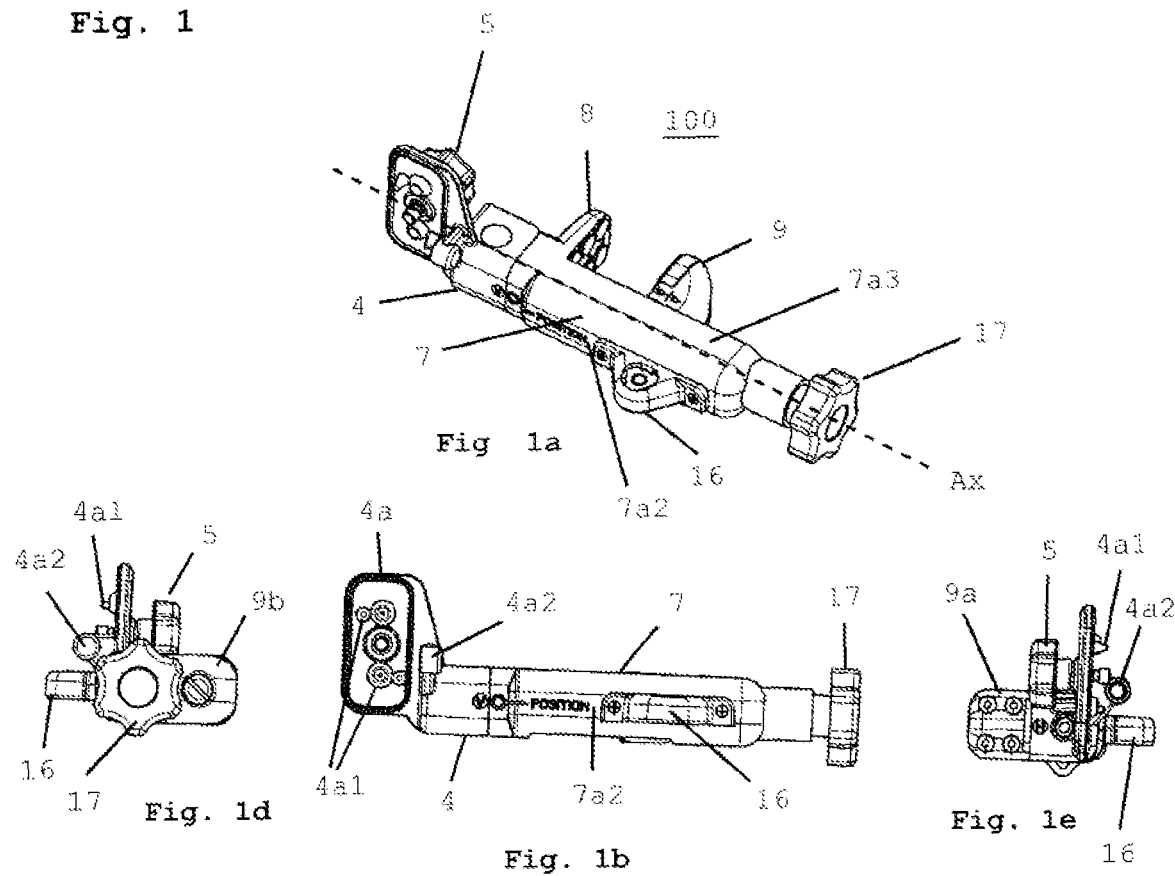
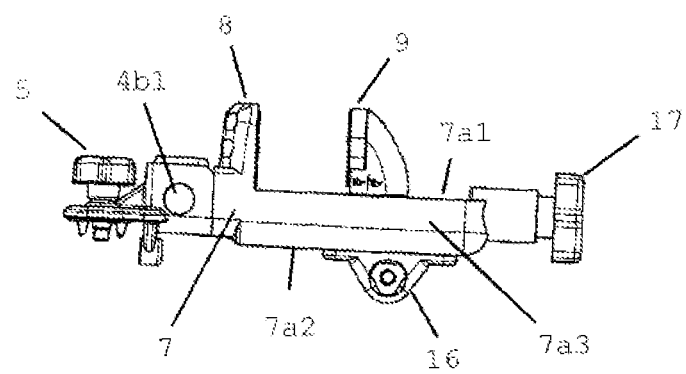

Fig. 3
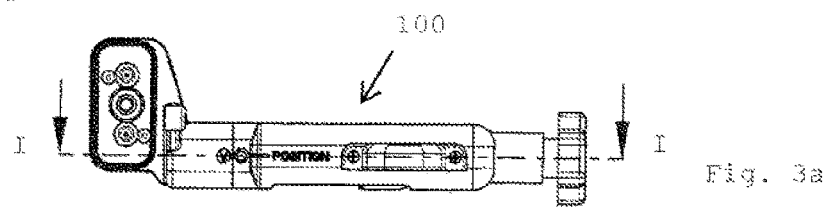
Fig. 3a
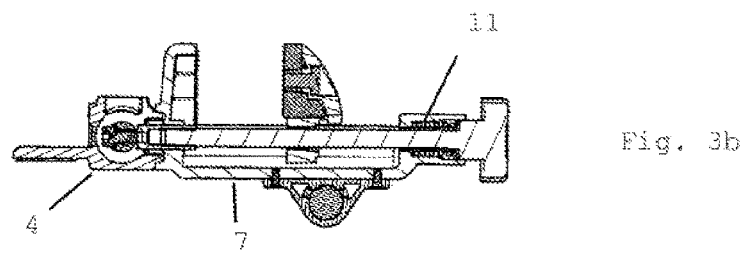
Fig. 3b
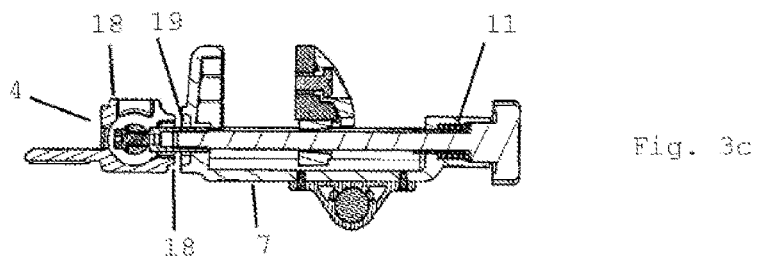
Fig. 3c
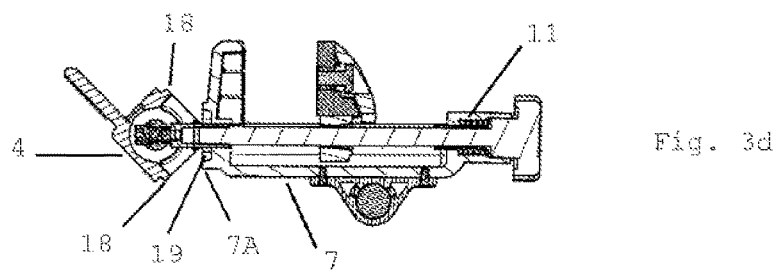
Fig. 3d
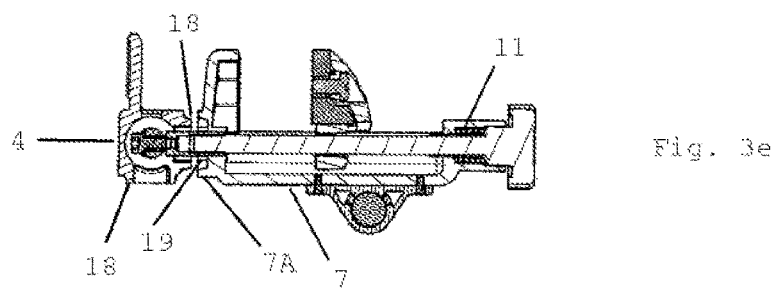
Fig. 3e
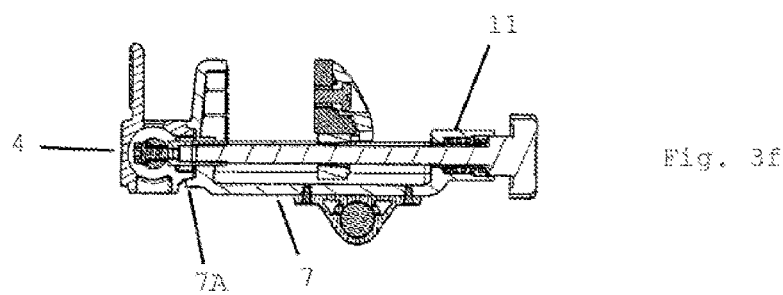
Fig. 3f Fig. 4
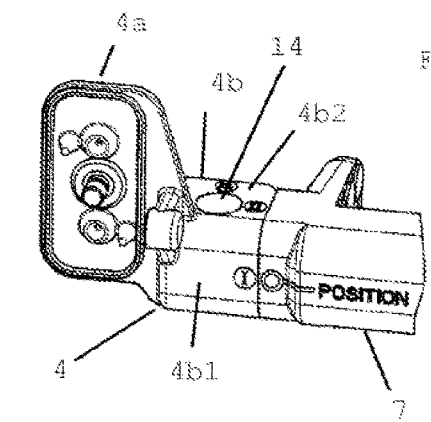
Fig. 4a
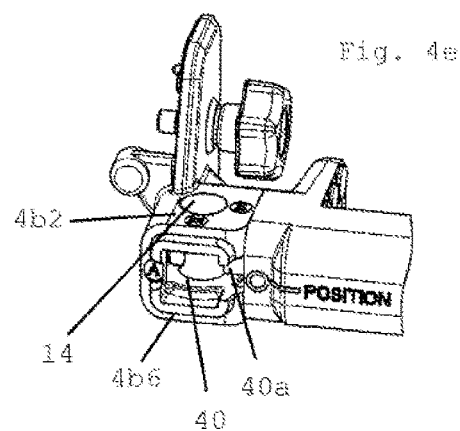
Fig. 4e
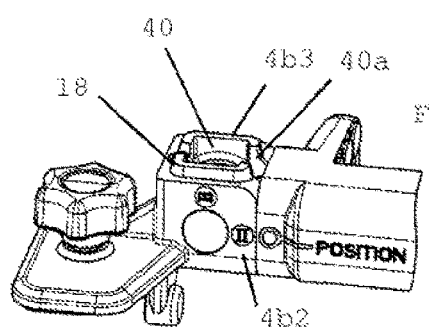
Fig. 4b
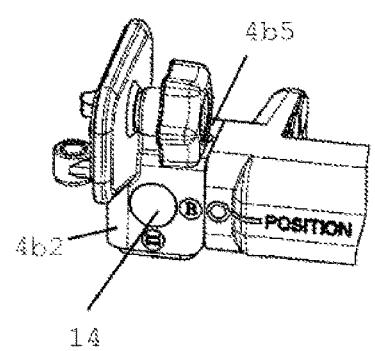
Fig. 4f
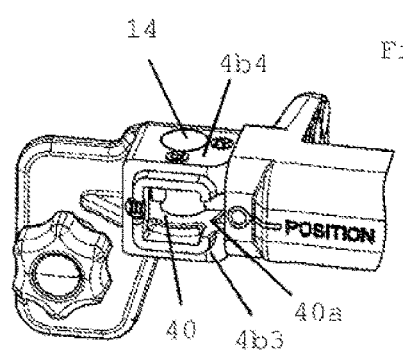
Fig. 4c
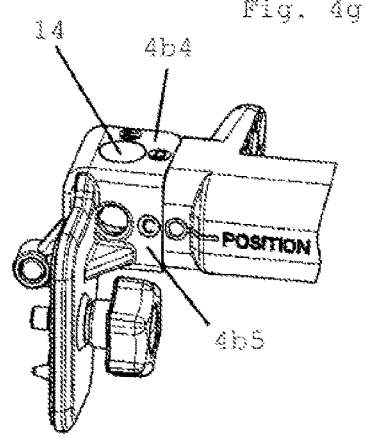
Fig. 4g
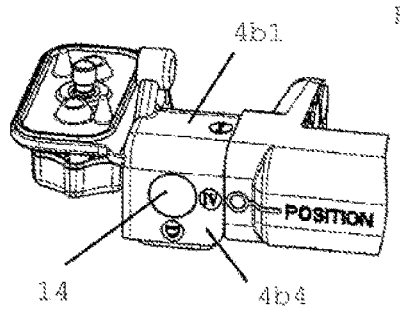
Fig. 4d
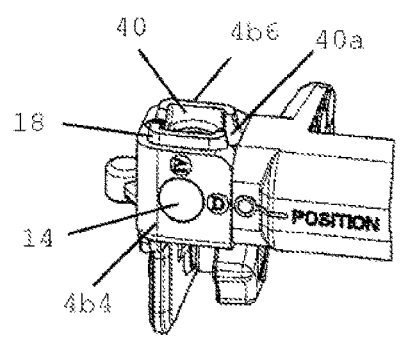
Fig. 4h

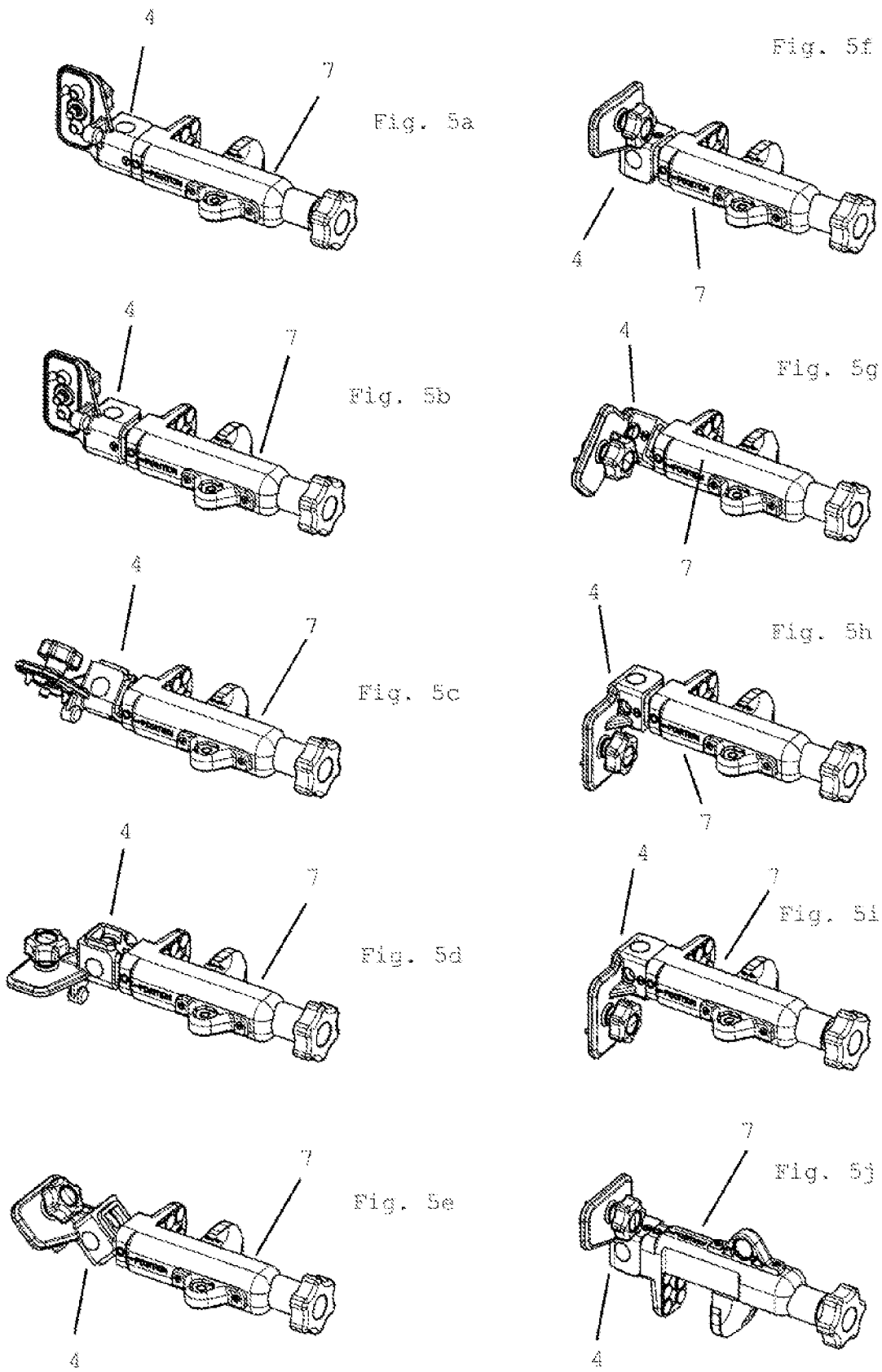

Fig. 6
Fig. 6a
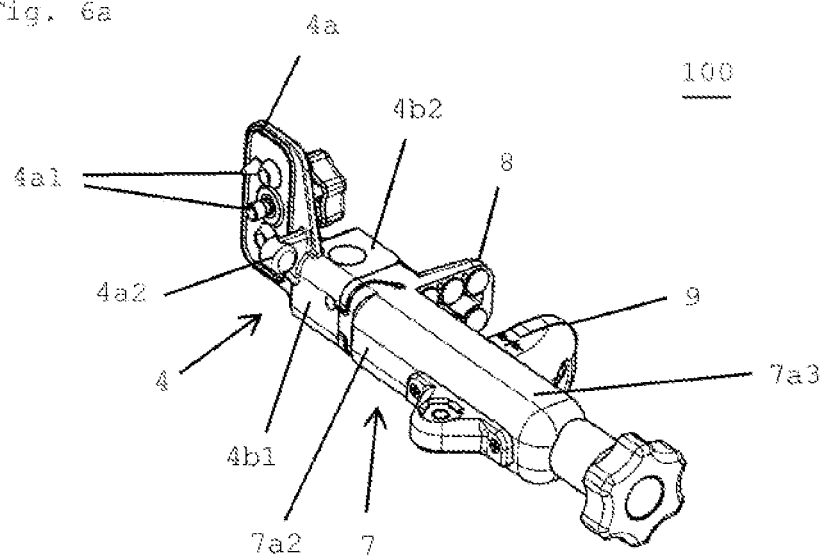
Fig. 6b
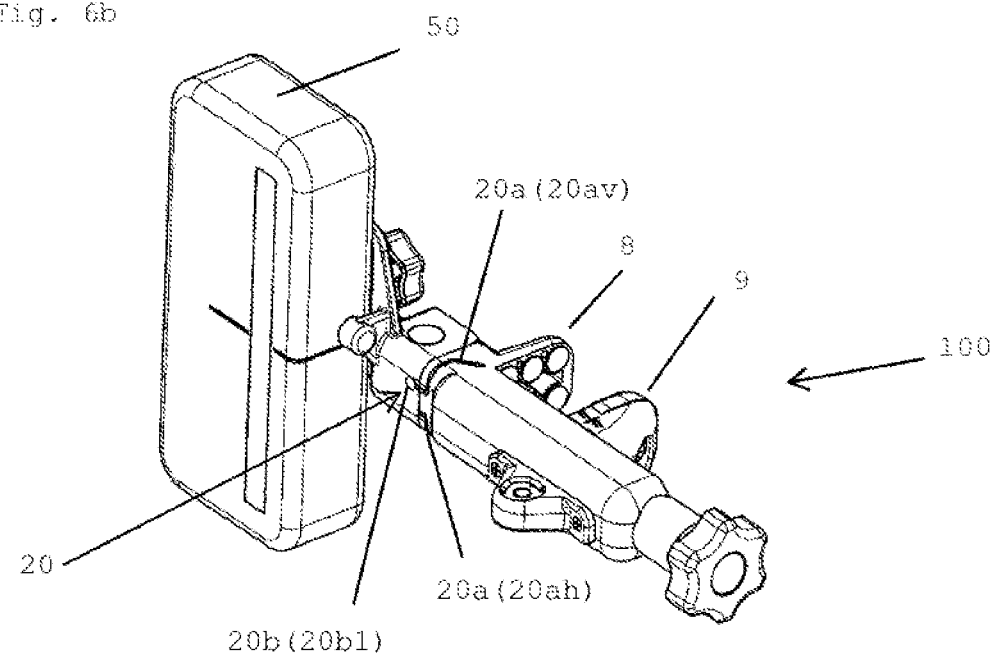

Fig. 7
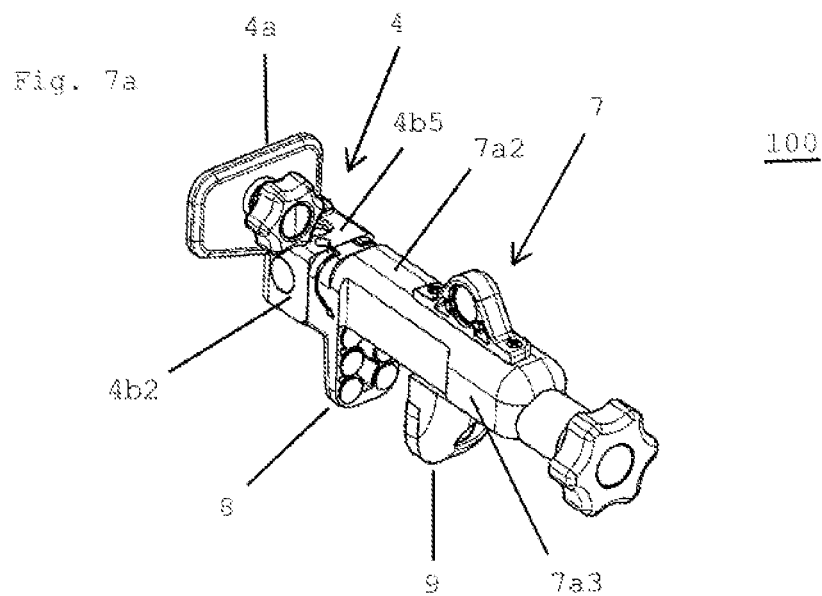
Fig. 7a
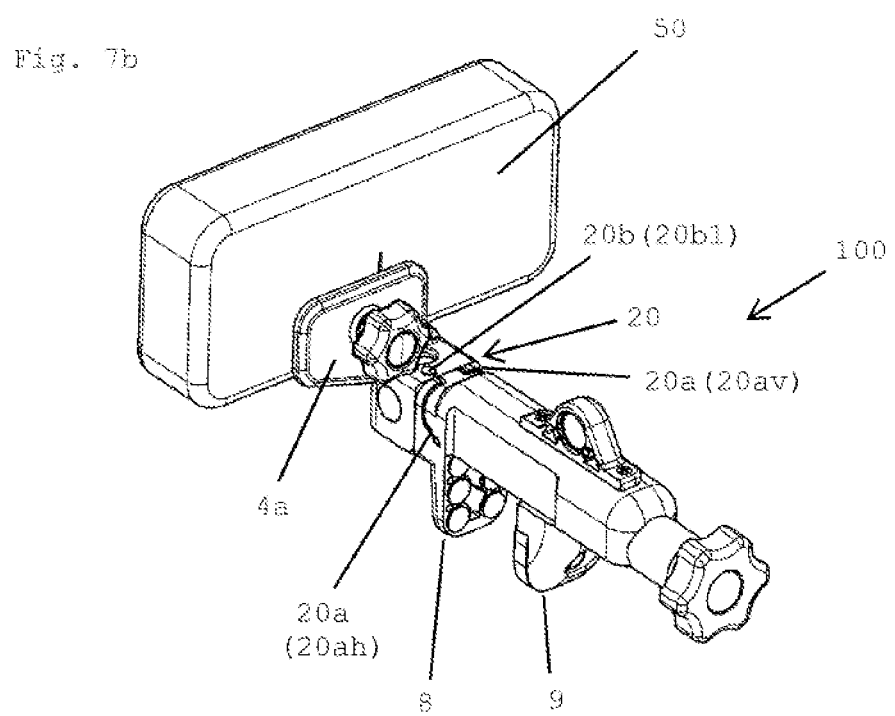
Fig. 7b

Fig. 8
Fig. 8a
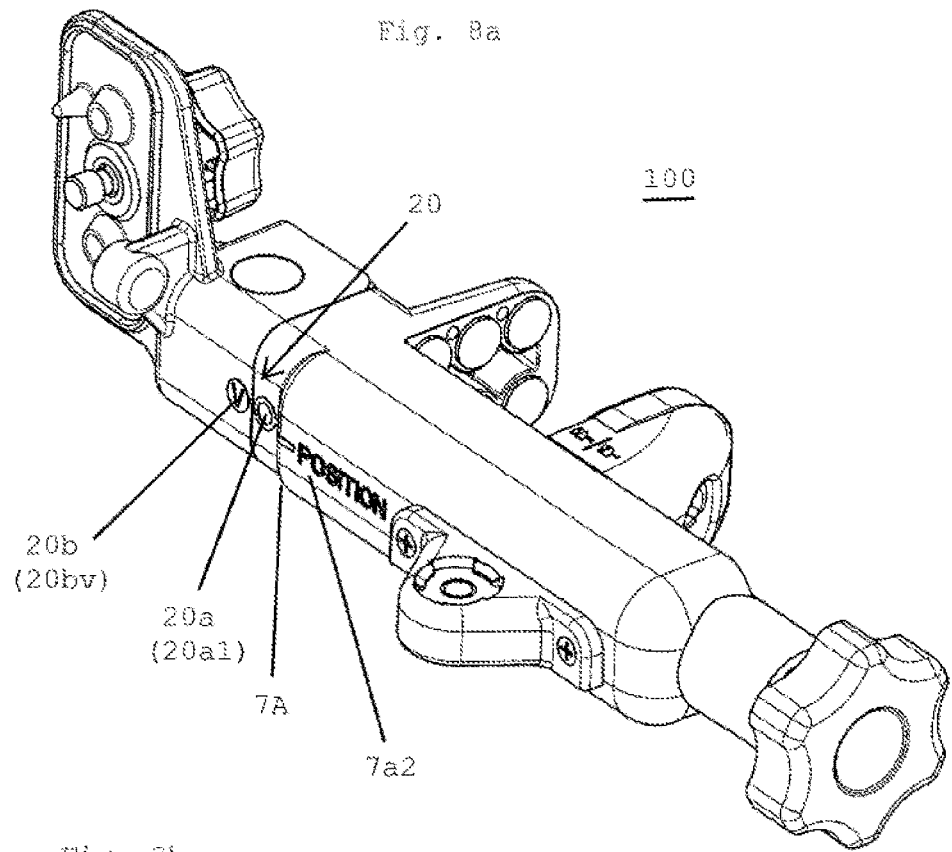
Fig. 8b
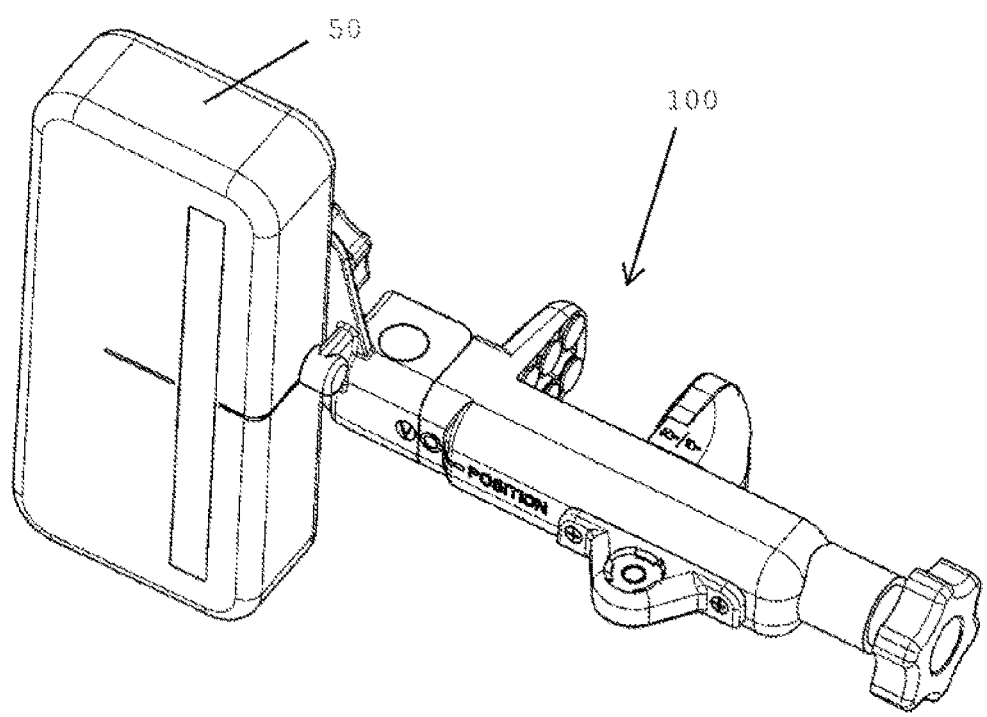

20b
(20bv)

FASTENER

CROSS-REFERENCE TO RELATED APPLICATIONS

This applications claims priority to German Application No. 102020213222.4, filed Oct. 20, 2020, the contents of which are incorporated herein by reference in their entirety for all purposes.

BACKGROUND

1. Field of the Invention

The present invention relates to a fastener and more particularly to an improved fastener, which is attachable to a first object (e.g. a structure such as a level rod or batter board at a construction site) and to which a second object (e.g. an electronic device such as a laser receiver for levelling and aligning applications) is mountable, and an electronic device comprising the same.

2. Description of Related Art

Laser receivers for levelling and aligning applications, which detect a laser beam of a laser device, can be used as either a handheld or rod mounted receiver. Rod clamps for mounting the laser receiver to a mounting structure such as a level rod or batter board at a construction site are known. For accurate detection of the laser beam, the laser receiver must be mounted in parallel to the mounting structure. Depending on the mounting structure to which the rod clamp is to be mounted, the laser receiver must be mounted either vertically or horizontally to the rod clamp. Commonly, rod clamps are configured to mount the laser receiver in a vertical orientation for use on a level rod. If the laser receiver is to be mounted in a horizontal orientation to the rod clamp, such as e.g. for use on a batter board, an additional adapter bracket is needed. Depending on the laser receiver used, also different adapters for different laser receivers may be required.

Known rod clamps for mounting the laser receiver to mounting structures such as level rods or batter boards at the construction site thus have a drawback in that many parts are needed, leading to increased space requirements for transport and storage, additional costs for the manufacturer as well as additional mounting effort for the user. Hence, a need for improvement exists.

SUMMARY

It is an object of the present invention to provide a fastener capable of easy and fast adjustment of a mounting orientation of an object to be mounted to the fastener, without the necessity of additional mounting adapters.

It is another object of the present invention to provide a fastener capable of flexible yet accurate positioning of an object to be mounted to the fastener while being compact.

To achieve the above and other objects, the present invention provides a fastener as defined in claim 1. Preferably, the fastener may be a fastener which is suitable for mounting an electronic device, i.e. a fastener for an electronic device. The electronic device may be a laser receiver for levelling and aligning applications, which detects a laser beam of a laser device. The fastener comprises a body part having a first end, a second end opposite to the first end in a longitudinal direction of the body part, and a main body section, extending between the first and second ends in the longitudinal direction of the body part. A fastening means for fixing the fastener to a first object (fastening object), such as a (level) rod or (batter) board at a construction site, is provided at the body part, preferably at the main body section. The fastener further comprises a mounting part for mounting a second object to the fastener, and a connecting means connecting the body part and the mounting part at the first end of the body part. The second object is preferably an electronic device, and the mounting part is preferably a device mounting part, which is suitable for mounting of the electronic device. However, the second object is not limited to an electronic device and may be a mechanical or optical device as well as other devices or structural elements, including, but not limited to, rods, bars, boards, tubes, beams, supports, struts etc. The mounting part is rotatable and pivotable relative to the body part so as to assume a predetermined orientation relative to the body part, and the body part is retractable from the mounting part. The fastener is adjustable between at least two operational states, either a first operational state, in which the body part and the mounting part are adjacent to each other, or a second operational state, in which the body part is retracted from the mounting part so that the body part and the mounting part are spaced apart from each other. In the first operational state, the predetermined orientation of the mounting part relative to the body part is fixed, and, preferably only, in the second operational state, the predetermined orientation of the mounting part relative to the body part is adjustable by rotating and/or pivoting the mounting part.

In the fastener of the present invention, the mounting part is rotatable and pivotable relative to the body part, thus, providing for easy and fast adjustment of the mounting orientation of the second object such as merely exemplarily an electronic device, in which the second object is to be mounted to the fastener, without the necessity to use additional mounting adapters. Further, the body part is retractable from the mounting part and in the second operational state, in which the body part is retracted from the mounting part, the predetermined orientation of the mounting part relative to the body part is adjustable by rotating and/or pivoting the mounting part, thus, providing for accurate positioning of the second object while being compact.

The fastening means may comprise a fixed member and a movable member, the fixed member being provided adjacent the first end of the body part, and the fastening means may be configured to be fastened to the first object by moving the movable member towards the fixed member and clamping the first object between the fixed member and the movable member.

The fastening means is configured as a clamp, thus, having a simple configuration. By providing the fastening means adjacent the first end of the body part, at which also the second object such as merely exemplarily an electronic device is to be mounted to the mounting part, mounting of the second object with a short lever and stable mounting of the fastener to the first object can be achieved.

The mounting part may comprise a first section having means for mounting the second object, and a second section to which the connecting means is attached. Means for mounting the second object may comprise protrusions, screws, magnets and other means known in the art such as recesses, for accurate positioning of the second object at the mounting part. Such means are particularly useful if the second object is an electronic device. Nevertheless, such means may also be useful for mounting other devices or structural elements. Further, means for mounting the second object may comprise clamping means known in the art, such as clamps, cramps, and clips. Also, combinations of different kinds of means for mounting are encompassed, depending on the particular intended use.

The connecting means may comprise a first connecting member extending from the second section of the mounting part to the body part in the longitudinal direction and a second connecting member being attached to the second section of the mounting part and extending in a direction transverse, preferably orthogonal, to the longitudinal direction. The first connecting member may be rotatably fitted in the second connecting member, and the second section of the mounting part may be rotatably fitted to the second connecting member.

With this configuration, the mounting part is rotatable about the first connecting member, i.e. about a longitudinal axis of the fastener, for rotating of the mounting part relative to body part, and the mounting part is rotatable about the second connecting member, i.e. about an axis which is transverse/orthogonal to the longitudinal axis, for pivoting of the mounting part relative to body part. Thus, different predetermined orientations of the mounting part relative to the body part can be achieved by a simple configuration.

The first connecting member may extend from the second section of the mounting part to the second end of the body part, and the first connecting member may have, at least partly in the area of the main body section of the body part, an external thread being configured to engage with an internal thread of the movable member of the fastening means. A handle may be attached to the first connecting member at the second end of the body part, the handle being configured to rotate the first connecting member for moving the movable member towards and away from the fixed member.

At least part of the first connecting member has an external thread for engagement with an internal thread of the movable member of the fastening means and is configured as an adjusting screw for adjusting the position of the movable member relative to the fixed member. Since the first connecting member, i.e. the longitudinal axis of the connecting means, is at least partly formed by the adjusting screw as such, the first connecting member serves as a rotation axis for the mounting part relative to the body part as well as an adjusting means for adjusting the position of the movable member relative to the fixed member, leading to a reduction in parts.

The fastener may further comprise fixing means for fixing the predetermined orientation of the mounting part relative to the body part, wherein the fixing means may be configured as a positive connection and/or a non-positive connection between the mounting part and the body part. Thereby, only in the second operational state, the predetermined orientation of the mounting part relative to the body part is adjustable by rotating and/or pivoting the mounting part and unintentional changing of the set orientation of the mounting part relative to the body part can be avoided.

The fixing means may be configured as a positive connection and the second section of the mounting part and the first end of the body part may have mating shapes, preferably, the second section of the mounting part having at least one protruding edge and the first end of the body part having at least one mating recess. Thereby, a positive connection between the mounting part and the body part can be achieved, reducing the risk of misplacement of the mounting part relative to the body part.

In addition to, or independently of the mounting part and the first end of the body part having mating shapes, the fixing means may be configured as a non-positive connection and may comprise an elastic member, such as a compression spring, configured to bias the body part toward the mounting part.

Thereby, a non-positive connection between the mounting part and the body part can be achieved by the biasing force of the elastic member, reducing the risk of misplacement of the mounting part relative to the body part.

The predetermined orientation of the mounting part relative to the body part may be adjustable in predefined discrete positions. This simplifies the accurate positioning of the mounting part relative to the body part and, therewith, the desired accurate positioning of the electronic device.

An abutment means may be provided at the main body section of the body part. The abutment means serves as an abutment for retraction of the body part from the mounting part and enables one-hand operation of the fastener. Preferably, the abutment means is configured as a circular spirit level device. Thereby, the fastener can be accurately aligned relative to the fastening object (first object).

At least one marker may be provided at the mounting part and/or the body part. This allows for an easy positioning of the mounting part relative to the body part in the intended orientation.

To achieve the above and other objects, the present invention also provides an electronic device, preferably a laser receiver for levelling and aligning applications, comprising the above fastener.

The above and other objects, features and advantages of the present invention will become apparent from the following detailed description taken in conjunction with the accompanying drawings.

BRIEF DESCRIPTION OF DRAWINGS

FIG. 1 shows a preferred embodiment of a fastener according to the present invention, wherein FIG. 1a is a perspective view, FIG. 1b is a plan view, FIG. 1c is a side view, FIG. 1d is a view from a second end of the fastener, and FIG. 1e is a view from a first end of the fastener.

FIG. 3 is a graph for illustrating the principle sequence of movement when adjusting the fastener, wherein FIG. 3a is a plan view similar to FIG. 1b and FIGS. 3b-3f are sectional views taken along line I-I in FIG. 3a.

FIG. 4 is a graph for illustrating different orientations of a mounting part relative to a body part of the fastener of FIG. 1, wherein FIGS. 4a-4h are perspective partial views of eight distinct positions, to which the fastener is adjustable.

FIG. 5 is a graph for illustrating adjustment of the fastener of FIG. 1 from vertical application to horizontal application, wherein FIGS. 5a to 5j are perspective views showing in detail the orientation of the mounting part relative to the body part of the fastener during the adjustment.

FIG. 6 is a graph for illustrating a vertical application state, wherein FIGS. 6a-6c are perspective views showing different stages of the vertical application state.

FIG. 7 is a graph for illustrating a horizontal application state, wherein FIGS. 7a-7d are perspective views showing different stages of the horizontal application state.

FIG. 8 is a graph for illustrating alternative markers of the fastener in the vertical application state, wherein FIG. 8a shows a perspective view of the fastener and FIG. 8b shows a perspective view of the fastener having a second object mounted.

FIG. 9 is a graph for illustrating alternative markers of the fastener in the horizontal application state, wherein FIGS. 9a and 9b show perspective views of the fastener and FIG. 9c shows a perspective view of the fastener having the second object mounted.

DETAILED DESCRIPTION

Figure 2A:
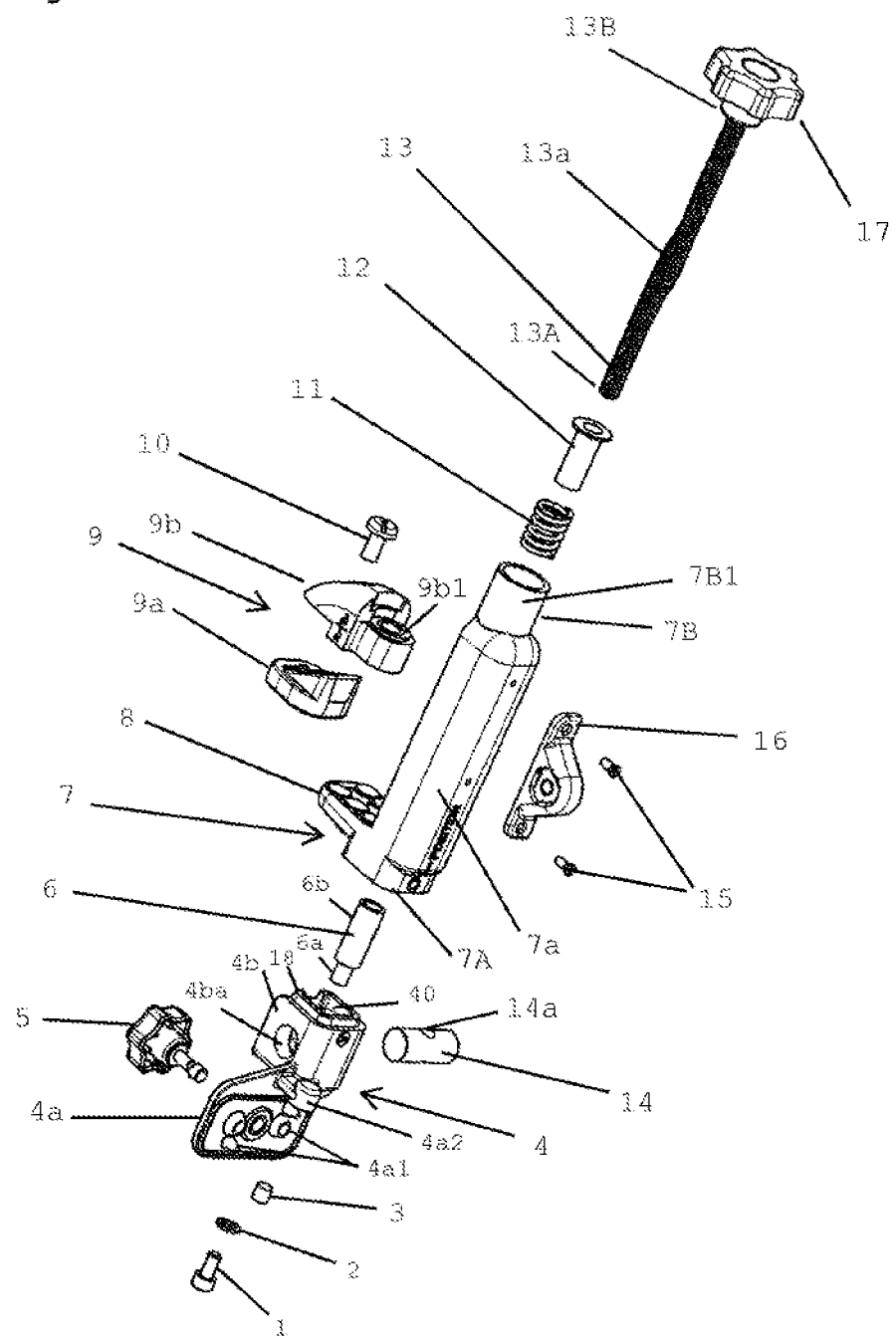
FIG. 2A is an exploded perspective view of the fastener, showing an embodiment in which a first connecting member is constituted by two parts.
Figure 2B:
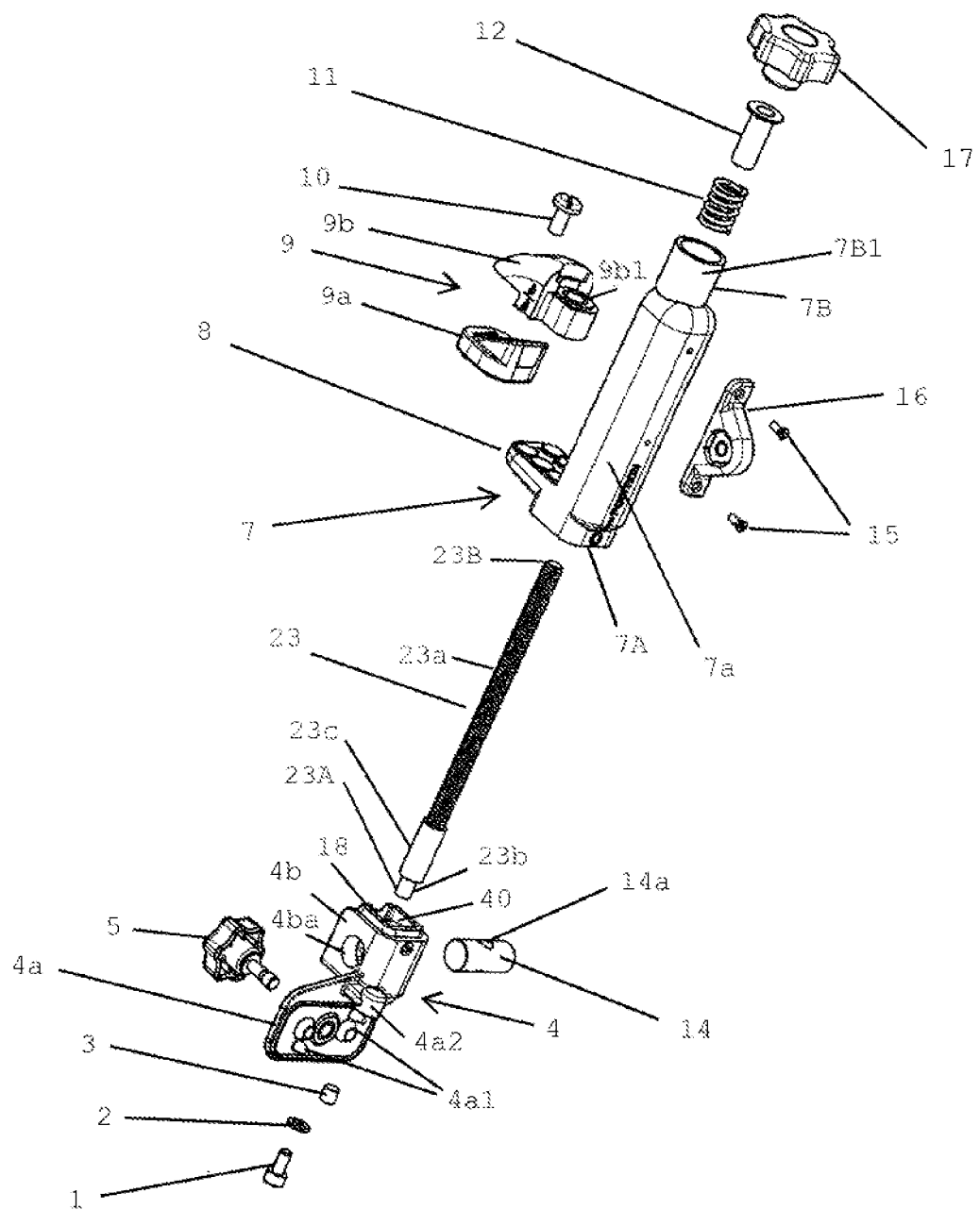
FIG. 2B is an exploded perspective view of the fastener, showing an embodiment with a one-piece first connecting member.

A fastener 100 in accordance with a preferred embodiment of the invention is shown in the various views of FIG. 1. The fastener 100 comprises a body part 7, which is a hollow part elongate along a longitudinal axis Ax of the fastener 100 (see FIG. 1a). In the preferred embodiment, the body part 7 has a rectangular cross-section. One side of the body part 7, i.e. a top part 7a1, is open such that the inner of the body part 7 is accessible from the outside (see FIG. 1c). At the top part 7a1 of the body part 7, a fastening means 8, 9 for fixing the fastener 100 to a first object 70 (in the following referred to as fastening object) is provided, which will be described in detail further below. The other sides of the body part 7, i.e. a bottom part 7a2 and two side parts 7a3, are closed such that the inside of the body part 7 is not accessible from the outside (see FIGS. 1a, 1b, 1c). The bottom part 7a2 is provided on the side of the body part 7 opposite to the top part 7a1, and an abutment means 16 is provided at the bottom part 7a2 of the body part 7, which will be described in detail further below. With reference to FIG. 2A and FIG. 2B, the body part 7 has a first end 7A and a second end 7B opposite to the first end 7A in a longitudinal direction of the body part 7. The longitudinal direction indicates a direction along the longitudinal axis Ax, shown in FIG. 1a. The body part 7 further comprises a main body section 7a, extending between the first and second ends 7A, 7B in the longitudinal direction of the body part 7.

The fastener 100 is attachable to the fastening object 70 (shown in FIG. 6c and FIGS. 7c, d) by means of the fastening means 8, 9. The fastening means 8, 9 for fixing the fastener 100 to the fastening object 70, such as a level rod or batter board at a construction site, is provided at the body part 7, preferably at the main body section 7a. In the preferred embodiment, the fastening means 8, 9 comprises a fixed member 8 and a movable member 9 and the fastening means 8, 9 is configured as clamping jaws. That is, the fastening means 8, 9 can be fastened to the fastening object 70 by moving the movable member 9 towards the fixed member 8 (to be described in detail later) and clamping the fastening object 70 between the fixed member 8 and the movable member 9. Thereby, the fastener 100 can be fastened to a fastening object 70 having an arbitrary width. Preferably, the fixed member 8 is provided adjacent the first end 7A of the body part 7. Nevertheless, the fixed member 8 may also be provided at another part of the main body section 7a of the body part 7 more distant from the first end 7A and closer to the second end 7B. Further, the fixed member 8 may be an integral part of the body part 7 or may be a separate part from the body part 7, e.g. attached by screws or other fixing means known in the art. The movable member 9 is a separate part from the body part 7 so as to be movable relative to the body part 7, towards and away from the fixed member 8. The movable member 9 may be a single part or may be constituted by several parts. In a preferred embodiment, the movable member 9 is constituted by two parts 9a, 9b, which are fixed to each other by a fixing means 10 such as a screw (refer to FIG. 2A and FIG. 2B). Thereby, the part 9a of the movable member 9 configured to touch the fastening object when clamping the fastener 100 to the fastening object, may be made of a different material from the other part 9b of the movable member 9. For instance, the part 9a of the movable member 9 may be made of a material having an improved adhesion to the fastening object, such as hard rubber. In addition to or independent of being made of a different material from part 9b, part 9a may have a specific geometry suitable for reliably fastening (clamping) objects having different external shapes, such as rods having a circular cross-section, boards having a rectangular cross-section etc. Thereby, reliable positive connections between the movable member 9 (9a) and fastening objects with different shapes may be achieved. The specific geometrical configuration of part 9a may comprise, but is not limited to, one of triangular-, wedge-, concave- and convex-shaped or any combination thereof. The specific shape of part 9a may be inversely to the shape of the fastening object 70, thus, the movable member 9 (9a) and the fastening object 70 having mating forms. In a particularly preferred embodiment, part 9a of movable member 9 is configured detachable such that it can be disassembled and reassembled upside down, depending on the geometry of the fastening object. Further, part 9a of movable member 9 may have different geometries on a front side thereof, with which the fastening object is to be contacted, and a rear side thereof, which is to be attached to part 9b of movable member 9. With other words, in addition to or separate from being capable of disassembling and reassembling upside down, part 9a may be mounted with any side facing the fastening object 70 by interchanging the respective front and rear sides thereof, thereby enabling quick and easy adjustment to the specific shape of the fastening object 70.

In a preferred embodiment, an electronic device as a second object 50, such as a laser receiver for levelling and aligning, which detects a laser beam of a laser device, may be mountable to the fastener 100 via a mounting part 4, such as e.g. shown in FIGS. 6 and 7, to be described in detail further below. The mounting part 4, however, is not limited to mounting of the electronic device, but may be suitable for mounting other devices or structural elements. The mounting part 4 may comprise a first section 4a having means 4a1, 4a2, 5 for mounting the second object 50 (exemplarily the electronic device), and a second section 4b to which a connecting means (connecting means 6, 13, 14 in FIG. 2A; connecting means 14, 23 in FIG. 2B) is attached, which will be described in detail further below. The means for mounting the second object 50 (exemplarily the electronic device) may comprise protrusions 4a1, a screw 5 and/or a magnet 4a2, 3 (see FIG. 1d, FIG. 1e, FIG. 2A, FIG. 2B). The magnet 4a2, 3 may comprise a magnetic element 3, preferably a neodymium magnet, and a magnet holder 4a2 for holding the magnetic element 3, being attached to or integral with the first section 4a. The neodymium magnet 3 may be used for automatic detection of different mounting positions of some electronic devices. Further to these means for mounting the second object 50, such as e.g. the electronic device, or in addition thereto, other means known in the art such as recesses, for accurate positioning of the second object 50 at the (device) mounting part 4, may be provided. The main parts of the fastener 100, such as the body part 7, the fastening means 8, 9 and the mounting part 4 may be made of plastics, e.g. formed by injection molding or 3D-printing technology.

As mentioned above, the fastener 100 further comprises the connecting means connecting the body part 7 and the mounting part 4 at the first end 7A of the body part 7. In the embodiment shown in FIG. 2A, the connecting means 6, 13, 14 comprises a first connecting member 6, 13 extending from the second section 4b of the mounting part 4 to the body part 7 in the longitudinal direction and a second connecting member 14 being attached to the second section 4b of the mounting part 4 and extending in a direction transverse, preferably orthogonal, to the longitudinal direction. The second connecting member 14 is provided as a bushing having a through-hole 14a through which a part of the first connecting member 6 is inserted. As shown in FIG. 2A, in the present embodiment, the first connecting member 6, 13 is constituted by two parts, namely a first bushing 6 and an adjusting screw 13. The first bushing 6 has two different outer diameters, a smaller diameter section 6a at an end of the first bushing 6 which is to be inserted into the through-hole 14a of the second bushing 14, and a larger diameter section 6b at the opposing end in the longitudinal direction. Thereby, a specific length of bushing 6 can be inserted into the through-hole 14a of the second bushing 14. The first bushing 6 is rotatably fitted in the through-hole 14a of the second bushing 14 such that the mounting part 4 via second bushing 14 is rotatable by 360° about the first bushing 6, i.e. about a longitudinal axis of the fastener 100, for rotating of the mounting part 4 relative to body part 7. Although the first bushing 6 is freely rotatable within the through-hole 14a of the second bushing 14, a movement of the first bushing 6 within the through-hole 14a of the second bushing 14 in the longitudinal direction is inhibited by restricting means 1, 2 so that the mounting part 4 (bushing 14) cannot fall off the first bushing 6. Although in FIG. 2A and FIG. 2B the restricting means is shown in form of a screw 1 and washer 2, it is not limited to such a configuration. Rather, any suitable restricting means can be used and, for instance, screw 1 could be replaced by a nut, Seeger ring or splint or the like. Further, the second section 4b of the mounting part 4 is rotatably fitted to the second connecting member 14. In particular, the second section 4b of the mounting part 4 is provided with a through-hole 4ba, into which the second bushing 14 is fitted. Thereby, the mounting part 4 is also rotatable about the second connecting member 14, i.e. about an axis which is transverse/orthogonal to the longitudinal axis, for pivoting of the mounting part 4 relative to body part 7. Further, for pivoting of the mounting part 4 relative to the body part 7 about the second connecting member 14, a cut-out or recess 40 is provided in the second section 4b of the mounting part 4, which will be described in more detail further below. Because the mounting part 4 is biaxially rotatable mounted, different predetermined orientations of the mounting part 4 relative to the body part 7, and therewith a desired position of the second object 50 (such as for instance the electronic device) mounted at second section 4b of mounting part 4, can be easily achieved by a simple configuration.

The first connecting member 6, 13 extends from the second section 4b of the mounting part 4 to the second end 7B of the body part 7. In the present embodiment, the first connecting member 6, 13 is constituted by two separate parts, the first bushing 6 and the adjusting screw 13. A first end 13A of the adjusting screw 13 is inserted into a hollow space of the larger diameter section 6b of the first bushing 6. The first end 13A of the adjusting screw 13 is fixed to the larger diameter section 6b of the first bushing 6 by means known in the art such as a bonded connection (e.g. adhesive), screwing, or press-fitting so that the two parts constituting the first connecting member 6, 13 are combined as an integral part. The most appropriate means for fixing of the first end 13A of the adjusting screw 13 to the larger diameter section 6b of the first bushing may be selected depending on the respective materials used. For instance, if the first bushing 6 is made of brass and the adjusting screw 13 is made of steel, adhesive bonding or screwing are to be preferred to achieve a solid and stable connection of the constituents with minimum manufacturing effort. Further, the first connecting member 13 has an external thread 13a being configured to engage with an internal thread 9b1 of the movable member 9 (9b) of the fastening means 8, 9. In an assembled state of the fastener 100, the external thread 13a is provided at least partly in the area of the main body section 7a of the body part 7. At a second end 13B of the adjusting screw 13, a handle (rotary knob) 17 is attached. In the assembled state of the fastener 100, the handle 17 is provided at the second end 7B of the body part 7. The handle 17 is configured to rotate the first connecting member 6, 13 for moving the movable member 9 towards and away from the fixed member 8. In the assembled state of the fastener 100, the external thread 13a of the adjusting screw 13 meshes with the internal thread 9b1 of the movable member 9 (9b). The movable member 9 has a width, i.e. an extension in a direction orthogonal to the longitudinal direction, such that it is guided at the side parts 7a3 of the body part 7. Thereby, a rotatory movement of the adjusting screw 13 by rotating the handle 17 is translated to translatory movement of the movable member 9 of the fastening means 8, 9 along the body part 7 in the longitudinal direction. The internal thread 9b1 of the movable member 9 (9b) may be directly cut in the movable member 9 (9b). On the other hand, in a preferred embodiment, the internal thread 9b1 is formed in a threaded sleeve provided in the movable member 9 (9b). With other words, part 9b the movable member 9 may comprise at least two components, a threaded sleeve and a surrounding part into which the threaded sleeve is embedded. In a particularly preferred embodiment, the threaded sleeve is made of metal, such as brass, and the surrounding part is overmolded on the threaded sleeve, for instance by injection molding of a plastic material. Thereby, although movable member 9 may be cost effectively made of plastics, fast wear of the thread may be avoided, and durability may be prolonged.

The fastener 100 may further comprise fixing means 11, 18, 19 for fixing the predetermined orientation of the mounting part 4 relative to the body part 7. The fixing means 11, 18, 19 may be configured as a positive connection and/or a non-positive connection between the mounting part 4 and the body part 7. In the preferred embodiment, fixing means 11, 18, 19 configured as a positive connection and a non-positive connection are provided. In this regard, the second section 4b of the mounting part 4 and the first end 7A of the body part 7 may have mating shapes, that is the mounting part may have a protruding edge 18 and the first end 7A of the body part 7 may have a mating recess 19 (see FIG. 3). Thereby, in a first operational state, in which the body part 7 and the mounting part 4 are adjacent to each other, the protruding edge 18 protrudes into the mating recess 19 and a positive connection between the mounting part 4 and the body part 7 is achieved. This reduces the risk of misplacement of the mounting part 4 relative to the body part 7. Although not shown in the Figures, the protruding edge does not necessarily have to be provided at the mounting part 4, but could alternatively be provided at the first end 7A of the body part 7, with the mounting part 4 comprising a mating shape such as a recess. Incidentally, the first operational state is the normal state of the fastener 100, meaning a state in which the fastener 100 is not manipulated to adapt the predetermined orientation of the mounting part 4 relative to the body part 7. In the first operational state, the body part 7 and the mounting part 4 are adjacent to each other, including abutting of bounding surfaces of the body part 7 and the mounting part 4 as well as merely being close to each other, but not in direct contact. Nevertheless, even if such bounding surfaces are not in direct contact with each other, at least part the protruding edge 18 should protrude into the mating recess 19 so as to maintain a positive connection between the mounting part 4 and the body part 7 in the first operational state. Further, in the preferred embodiment, the fixing means also comprises a compression spring 11 as an example of an elastic member configured to bias the body part 7 toward the mounting part 4. Although not shown, the elastic member could also be embodied by other elements suitable for biasing the body part 7 toward the mounting part 4 such as disc springs. In the preferred embodiment, a sleeve 12 having a flange at one end thereof is provided, which, in the assembled state of the fastener, is placed on the adjusting screw 13 at the second end 13B thereof with the flange provided adjacent the handle 17. The compression spring 11 is provided on the sleeve 12, with one end abutting against the flange of the sleeve 12. The body part 7 further comprises a cylindrical, hollow extension 7B1. At the end of the hollow extension 7B1 adjacent the main body section 7a, a wall is provided having a hole with a diameter suitable for the adjusting screw 13 to pass through. The compression spring 11, having a diameter larger than the adjusting screw 13, abuts against the wall of the extension 7B1. The body part 7 can be retracted from the mounting part 4 by being pulled towards the handle 17, thereby compressing spring 11. When retracting the body part 7, part of the handle 17 may be guided within the hollow extension 7B1. In the retracted state, which is a second operational state, the body part 7 and the mounting part 4 are spaced apart from each other, the positive connection as well as the non-positive connection are released, and the orientation of the mounting part 4 relative to the body part 7 is adjustable by rotating and/or pivoting the mounting part 4. After the force of pulling back the body part 7 is released, the compression spring 11 again expands and thereby presses the body part 7 towards the mounting part 4. Thereby, a non-positive connection between the mounting part 4 and the body part 7 can be achieved by the biasing force of the elastic member 11, and, in the preferred embodiment, also the recess 19 is engaged with the protruding edge 18 when the compression spring 11 expands and pushes the body part 7 toward the mounting part 4, so that both non-positive and positive connections are achieved.

As outlined above, in the present embodiment, the spring 11 is provided in addition to the positive connection between the protruding edge 18 and mating recess 19, thus, additionally fixing the predetermined orientation of the mounting part 4 relative to the body part 7. In the first operational state, the elastic member 11 presses the body part 7 toward the mounting part 4. In this biased state, the orientation of the mounting part 4 relative to the body part 7 is fixed and might only be changed with great effort, because the positive and non-positive connections must be overcome. Further, the second operational state, in which the orientation of the mounting part 4 relative to the body part 7 is adjustable, may only be reached with interaction of a user, namely retraction of the body part 7 from the mounting part 4 by compressing the elastic member 11. Thus, unintentional changing of the set orientation of the mounting part 4 relative to the body part 7 can be avoided.

As outlined above, the predetermined orientation of the mounting part 4 relative to the body part 7 can only be adjusted in the second operational state. This also implies that the mounting part 4 is secured against inadvertent adjustment when the fastening means 8, 9 is fastened to a fastening object by clamping the fastening object between the movable member 9 and the fixed member 8. This is because the first connecting member 6, 13, i.e. the part of the connecting means 6, 13, 14 extending in the longitudinal direction, is at least partly formed by the adjusting screw 13 as such. Thereby, the first connecting member 6, 13 serves as a rotation axis for the mounting part 4 relative to the body part 7 as well as an adjusting means for adjusting the position of the movable member 9 relative to the fixed member 8. This leads to a reduction in parts and provides an additional protection against unintentional adjustment in the clamped/fastened state. Further, the fastener 100 of the present invention is insensitive to dirt, because of the compact design in which the adjusting screw 13 serving as both, rotation axis for the mounting part 4 relative to the body part 7 as well as adjusting means for adjusting the position of the movable member 9 relative to the fixed member 8, is accommodated within the body part 7.

Above, the embodiment shown in FIG. 2A has been described, in which the first connecting member 6, 13 is constituted by two parts, namely the first bushing 6 and the adjusting screw 13. However, the present invention is not limited to this and the first connecting member may be configured as a single part. FIG. 2B shows an embodiment with a one-piece first connecting member 23. In FIG. 2A and FIG. 2B like reference signs denote like elements and a detailed description thereof will be omitted. Rather, in the following, the differences between the embodiments shown in FIG. 2A and FIG. 2B will be discussed. In this regard, in the embodiment shown in FIG. 2B, an adapted one-piece adjusting screw 23 is provided, instead of the combination of the first bushing 6 and the adjusting screw 13 shown in FIG. 2A. The adjusting screw 23 has a first end 23A, which is to be attached to the mounting part 4, and a second end 23B, to which the handle 17 may be attached. Further, the adjusting screw 23 has an external thread 23a being configured to engage with the internal thread 9b1 of the movable member 9 (9b) of the fastening means 8, 9. The external thread 23a extends from the second end 23B of the adjusting screw 23, at least partly, towards the opposing first end 23A of the adjusting screw. The first end 23A portion of the adjusting screw 23 is provided in a stepped form like the first bushing 6 shown in FIG. 2A. That is, in the embodiment shown in FIG. 2B, the first end 23A of the adjusting screw 23 has two different outer diameters, a smaller diameter section 23b which is to be inserted into the through-hole 14a of the second bushing 14, and a larger diameter section 23c, which is provided adjacent the threaded section 23a of the first connecting member 23 in FIG. 2B. The functions and effects of the single-piece first connecting member 23, as shown in FIG. 2B, are the same as those of the two-piece first connecting member 6, 13, as shown in FIG. 2A. In addition, by providing the first connecting member 23 as a single part, the number of parts required for the fastener 100 may be reduced, contributing to a reduction of costs.

The basic motion sequence when adjusting the fastener 100 will be explained with reference to FIG. 3. FIGS. 3b to 3f are sectional views taken along line I-I in FIG. 3a and showing different stages when pivoting the mounting part 4 relative to the body part 7. At an initial state, the fastener 100 is in the first operational state in which the body part 7 and the mounting part 4 are adjacent to each other (see FIG. 3b). When retracting the body part 7, that is pressing the body part 7 against the compression spring 11 to thereby compress the compression spring 11, the protruding edge 18 is released from the mating recess 19 and the positive connection is released (see FIG. 3c). In this state, which is the second operational state, the mounting part 4 can be pivoted and/or rotated relative to the body section 7. In FIGS. 3d and 3e it is shown how the mounting part 4 is pivoted by 90° relative to the body part 7. After the mounting part 4 has been pivoted to the desired position, the user stops pulling back the body part 7 and the compression spring 11 again expands and thereby presses the body part 7 towards the mounting part 4. In this state, the non-positive connection between the mounting part 4 and the body part 7 is achieved by the biasing force of the elastic member 11, and the recess 19 is again engaged with the protruding edge 18 so as to achieve a positive connection as well (see FIG. 3f).

Referring to FIG. 4, in the fastener 100 of the present invention, the predetermined orientation of the mounting part 4 relative to the body part 7 is adjustable in predefined discrete positions. As an example, in levelling and aligning applications, orthogonally allocated alignment of an electronic device may be favourable, for instance detection of laser beam with receiver (electronic device) in vertical/horizontal directions. In view of this, it is preferable that the mounting part 4 is adjustable relative to the body part 7 in predefined discrete positions, preferably every 90°. In the present embodiment, the mounting part 4 comprises the first section 4a and the second section 4b. The first section 4a having the means 4a1, 4a2, 5 for mounting the second object 50, such as the electronic device, has a plate-like form. The second section 4b, which is provided integrally with the first section 4a, has a form of a cube. The cube has six faces 4b1, 4b2, 4b3, 4b4, 4b5, 4b6. Two faces 4b3, 4b6 out of the six faces 4b1, 4b2, 4b3, 4b4, 4b5, 4b6 of the cube 4b have cut-outs or recesses 40 for allowing passage of the first connecting member 6, 13, 23. In particular, the first section 4a is provided orthogonally substantially on one face 4b5 of the cube 4b, closer to face 4b1 than face 4b3 and substantially extending along face 4b1 (see FIG. 4f). The face 4b6 of the cube 4b, which is opposing the face 4b5 at which the first section 4a is provided, has the cut-out 40 for allowing passage of the first connecting member 6, 13, 23 (see FIG. 4h). Also, two opposing side faces 4b2, 4b4 of the cube 4b, extending orthogonally to the plate-like first section 4a, comprise the through-holes 4ba into which the second connecting member 14 is fitted, such that the second connecting member 14 fitted into the through-holes 4ba extends in parallel to the plate-like first section 4a (see FIGS. 2A, 2B, 4a-4h). At one of the two remaining faces 4b1, 4b3 of the cube 4b, in particular the face 4b3 of the cube 4b remote from the means 4a1, 4a2, 5 for mounting the second object 50 (such as for example an electronic device), also the cut-out 40 is provided. Thus, both faces 4b3, 4b6 of the cube 4b having the cut-out 40 are adjacent to each other and the cut-outs 40 are continuously connected so as to provide a passage 40a for first connecting member 6, 13, 23 from the cut-out 40 in one face 4b3, 4b6 of the cube 4b to the cut-out 40 in the adjacent face 4b6, 4b3 of the cube 4b when pivoting the cube (mounting part 4) relative to the body part 7. Correspondingly, also the protruding edge 18 may extend along three sides on the respective face 4b3, 4b6 of the cube 4b, since the fourth side of the respective face 4b3, 4b6 of the cube 4b has the cut-out 40, as shown in FIGS. 4b, c, e, h. Since the mounting part 4 has the cut-out 40 extending over two adjacent surfaces 4b3, 4b6 of the cube-like second section 4b, the mounting part 4 may be pivoted to two distinct positions. A first position, in which the first connecting member 6, 13, 23 extends through the cut-out 40 of a first face 4b3, 4b6 of the cube 4b, and a second position, in which the first connecting member 6, 13, 23 extends through the cut-out 40 of a second face 4b6, 4b3 of the cube 4b, which is adjacent the first face 4b3, 4b6. Incidentally, it is preferable that the first connecting member 6, 13, 23 has a diameter only slightly smaller than the cut-outs 40 or the connecting passage 40a between the cut-outs 40, so that there is only a little clearance between the first connecting member 6, 13, 23 and the cube-like second section 4b, when the cube-like second section 4b is pivoted. At the periphery of each of these first 4b3, 4b6 and second faces 4b6, 4b3 of the cube-like second section 4b, the protruding edge 18 is provided at three sides, as described above. The single mating recess 19 provided at the first end 7A of the body part 7 has a corresponding square form so as to accommodate the protruding edges 18 provided at three sides of the respective cube faces 4b3, 4b6 (see FIG. 3). Thereby, the mounting part 4 may be pivoted to two distinct positions, which deviate by 90° from each other. Further, in the second operational position, the mounting part 4 may be freely rotated about the first connecting member 6, 13, 23 extending in the longitudinal direction. Thus, the cube-like second section 4b can be fitted to the body part 7 in four different orientations by rotating about the longitudinal axis Ax, in each of these four different orientations the respective protruding edges 18 mating with the recess 19 at the first end 7A of the body part. Therefore, also by rotation about the longitudinal axis Ax, the orientation of the mounting part 4 relative to the body part 7 may be changed to four distinct positions, which deviate by 90° from each other. Since the fastener 100 of the present invention has two distinct pivoting positions and four distinct rotation positions, in total eight distinct positions can be adjusted with a cube-like second section 4b as outlined above. Although not illustrated, if desired, the fastener 100 could be adjusted to more different positions by providing the second section of the mounting part 4 in another form than the shown cube form 4b, such as e.g. a spherical or partly spherical form.

The eight distinct positions, to which the fastener can be adjusted with a cube-like second section 4b, are shown in FIGS. 4a-h, which are perspective partial views of the fastener 100 illustrating the different orientations of the mounting part 4 relative to the body part 7. For instance, for levelling and aligning applications, mainly two application states of the fastener 100 are needed, a vertical application state (e.g. fastening at a level rod) and a horizontal application state (e.g. fastening at a batter board). FIGS. 4a-d show the fastener 100 in the vertical position, i.e. an orientation of the mounting part 4 relative to the body part 7 suitable for vertical application, and FIGS. 4e-h show the fastener 100 in the horizontal position, i.e. an orientation of the mounting part 4 relative to the body part 7 suitable for horizontal application. An adjustment of the fastener 100 from the orientation for vertical application to the orientation for horizontal application is shown in detail in FIG. 5. FIG. 5a shows the fastener 100 in the vertical position. The fastener 100 is in the first operational state, in which the body part 7 and the mounting part 4 are adjacent to each other. For adjusting the orientation for vertical application to the orientation for horizontal application, the body part 7 is retracted from the mounting part 4 (see FIG. 5b) so as to get into the second operational state and the mounting part 4 is pivoted and rotated into the desired position (see FIGS. 5c to 5h). When the desired position, that is the predetermined orientation of the mounting part 4 relative to the body part 7, is reached by rotating and/or pivoting the mounting part 4 relative to the body part 7, the force of pulling back the body part 7 is released, the compression spring 11 re-expands and the fastener 100 is returned again to the first operational state, in which the predetermined orientation of the mounting part 4 relative to the body part 7 is fixed (see FIGS. 4i, j).

With reference again to FIGS. 1, 2A and 2B, in the preferred embodiment, an abutment means 16 is provided at the main body section 7a of the body part 7. The abutment means 16 serves as an abutment for retraction of the body part 7 from the mounting part 4 to reach the second operational state. In this regard, a finger, e.g. the thumb or the index finger, of a user may rest on the abutment means 16 as an abutment or the abutment means 16 may be pulled to compress the elastic member 11, respectively, so as to move the body part 7 and the mounting part 4 apart from each other, thereby reaching the second operational state. This enables a one-hand operation of the fastener 100 so that one hand of the user may easily release the mounting part 4 from the body part 7 by retracting the body part 7 from the mounting part 4 and the other hand of the user may rotate and/or pivot the second object (such as the electronic device) mounted at the second section 4b of the mounting part 4 to a desired position. Thus, the operability of the fastener 100 is considerably simplified. Preferably, the abutment means 16 is configured as a circular spirit level device. Thereby, the fastener 100 can be accurately aligned relative to the fastening object (first object). The circular spirit level device may comprise the circular spirit level as such as well as a holding part surrounding and fixing the circular spirit level. The holding part of the circular spirit level may be made of any suitable material, wherein, from the point of view of cost efficiency, the holding part may be made of plastics. From FIGS. 1, 2A and 2B it can be taken that the circular spirit level device (abutment means 16) has an approximate tri-angular form, for easy and convenient abutment of a finger of a user. Nevertheless, although not shown, the abutment means 16 may be simply formed as a protruding element without any further function, either integral with the body part 7 or as a separate element, as long as its shape allows it to be used as an abutment. In the preferred embodiment, the abutment means 16 configured as the circular spirit level device is a separate element from the body part 7, which is fixed to the body part 7 by fixing means known in the art, such as screws 15. Further, preferably, the abutment means 16 is provided at the main body section 7a closer to the second end 7B, adapted to a finger span of a user so as to provide for comfortable one-hand operation of the fastener 100.

Figure 9:
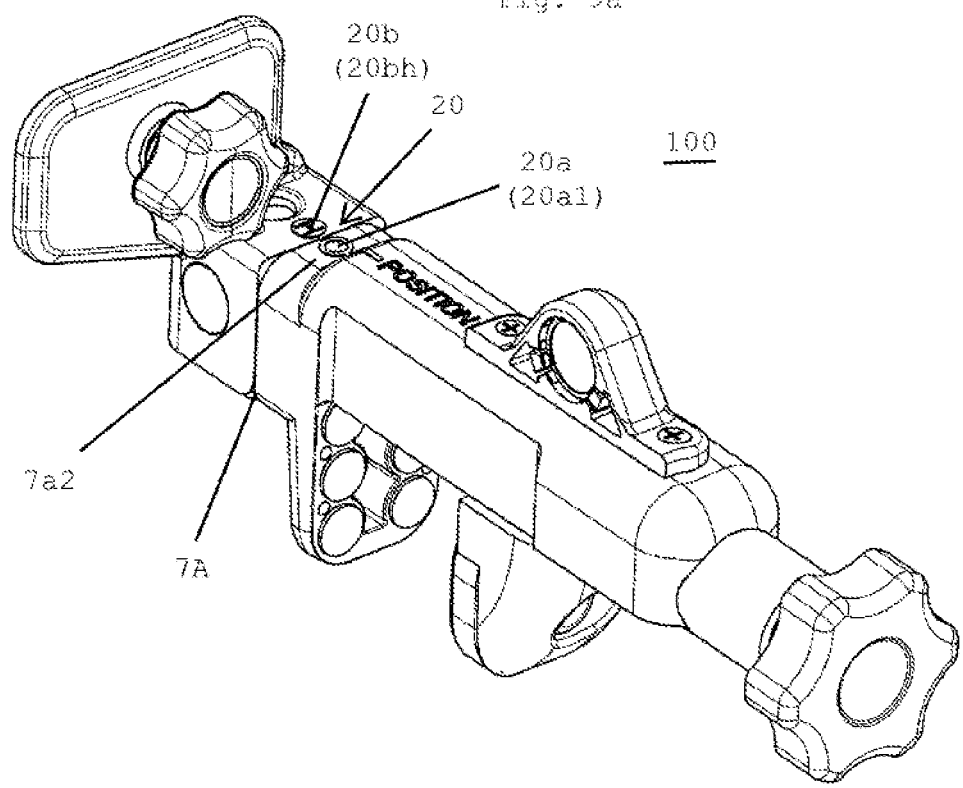

The two main application states of the fastener 100 in e.g. levelling and aligning applications are shown in further detail in FIGS. 6-9, i.e. the vertical application (see FIGS. 6, 8) and the horizontal application (FIGS. 7, 9).

Figure 6C:
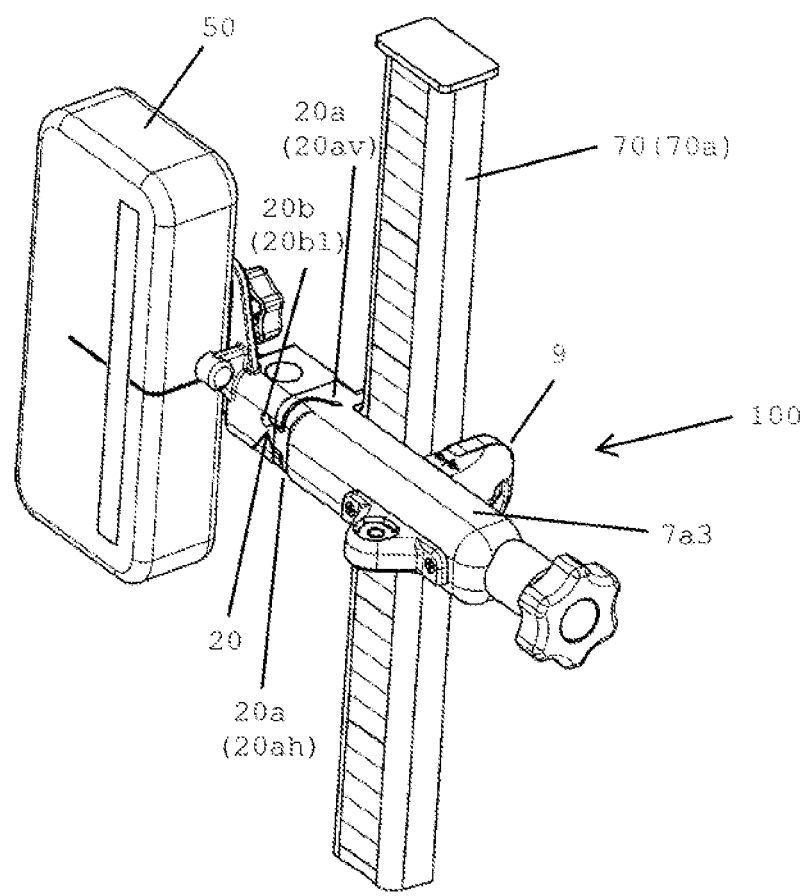

A fastener 100 suitable for vertical application is shown in FIG. 6. In the vertical application, the fastener 100 is e.g. to be fastened to a level rod 70a as the fastening object 70, which may extend in a vertical direction from ground. As can be taken from FIG. 6a, in the vertical application state, face 4b2 of the mounting part 4 is positioned at the side part 7a3 of the body part 7 and face 4b1 of the mounting part 4 is positioned at the bottom part 7a2 of the body part 7, such that the face of the first section 4a of the mounting part 4 comprising the means 4a1, 4a2 for mounting of the second object 50 is facing in the same direction as the bottom part 7a2 of the body part 7. For the vertical application, then, the second object 50, such as e.g. an electronic device, is mounted to the fastener 100 by use of the mounting means 4a1, 4a2 (see FIG. 6b). Thereafter, the fastener 100 is attached to the fastening object 70, such as a level rod 70a, using the fastening means 8, 9, wherein the movable member 9 is moved towards the fixed member 8 to clamp the fastening object 70 between the fixed member 8 and the movable member 9 (see FIG. 6c).

Figure 7C:
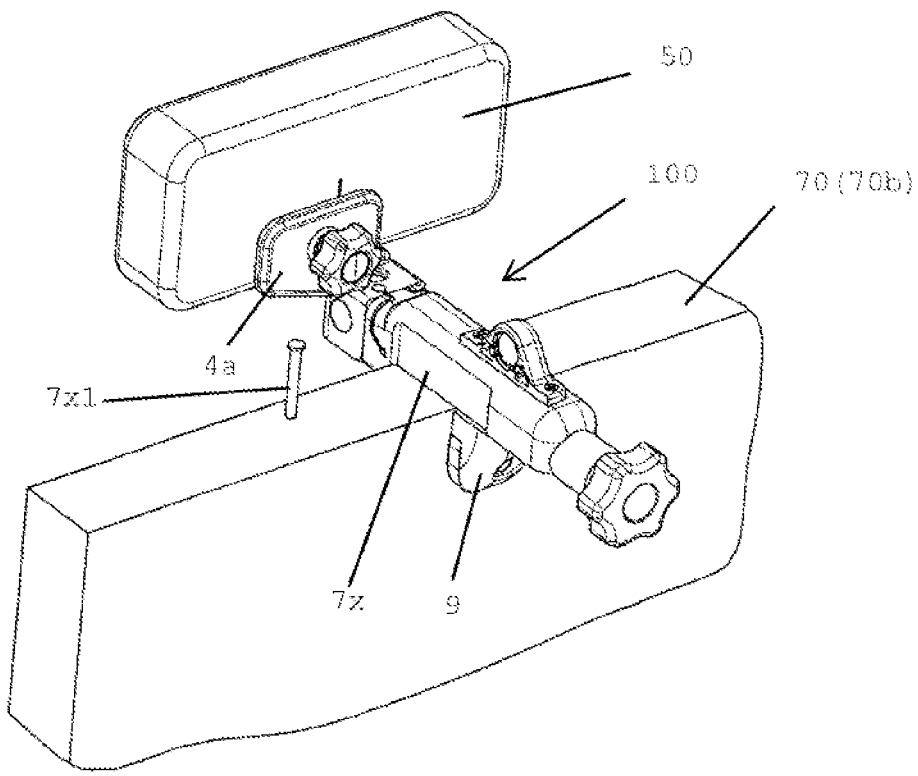

Further, a fastener 100 suitable for horizontal application is shown in FIG. 7. In the horizontal application, the fastener 100 is e.g. to be fastened to a batter board 70b as the fastening object 70, which may extend in a horizontal direction substantially parallel to ground. As can be taken from FIG. 7a, in the horizontal application state, face 4b2 of the mounting part 4 is positioned at the side part 7a3 of the body part 7 and face 4b5 of the mounting part 4 is positioned at the bottom part 7a2 of the body part 7, such that the face of the first section 4a of the mounting part 4 comprising the means 4a1, 4a2 for mounting of the second object 50 is orthogonal to the extension the bottom part 7a2 of the body part 7 along the longitudinal axis Ax, facing in a direction away from the body part 7. For the horizontal application, then, the second object 50, such as e.g. an electronic device, is mounted to the fastener 100 by use of the mounting means 4a1, 4a2 (see FIG. 7b). Thereafter, the fastener 100 is attached to the fastening object 70, such as a batter board 70b, using the fastening means 8, 9, wherein the movable member 9 is moved towards the fixed member 8 to clamp the fastening object 70 between the fixed member 8 and the movable member 9 (see FIGS. 7c, d).

Figure 7D:
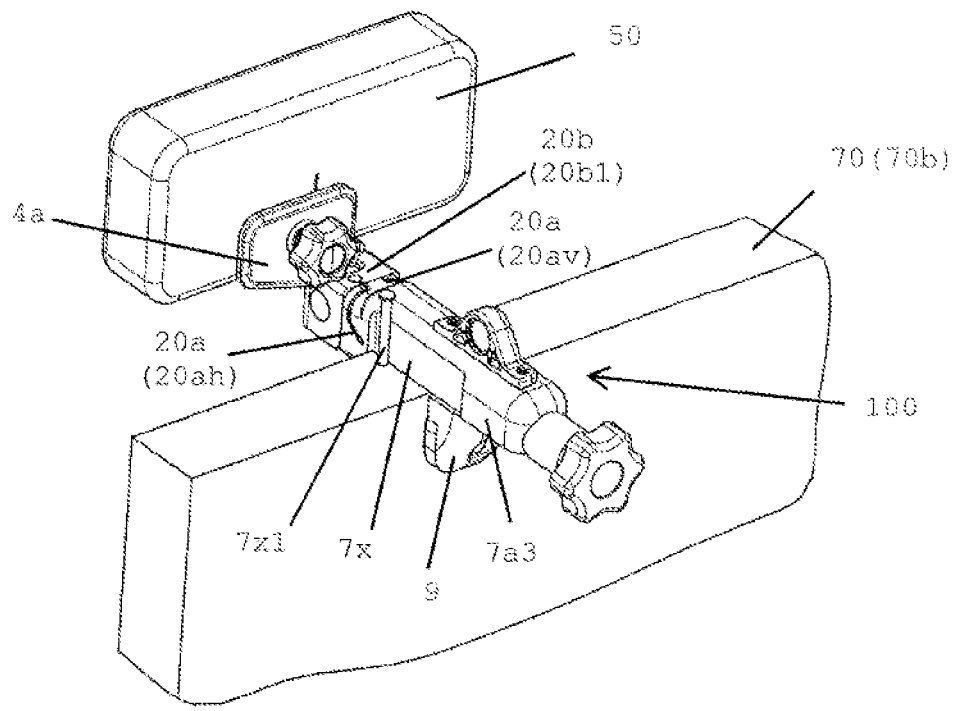

In FIGS. 7c and 7d, the batter board 70b is shown with a nail 7x1 driven in, which may be used for attaching a string. Advantageously, the body part 7 is provided with a cut-out or recessed section 7x at at least one side part 7a3 (refer to FIGS. 7c, d). Although, generally, the cut-out section 7x may be provided at both side parts 7a3, it is preferred to provide the cut-out section 7x merely at one of the side parts 7a3, whereas the opposite side part 7a3 has a continuous planar surface. The cut-out section 7x enables alignment e.g. relative to the nail 7x1 in the horizontal application state, as shown in FIG. 7d. Preferably, the cut-out section 7x has a depth of half of a nail commonly used in levelling and aligning applications, so that the fastener 100 can be aligned to the middle of the nail. If the cut-out section 7x is merely provided at one side part 7a3, alignment relative to the nail 7x1 in the horizontal application state is possible, and, in the vertical application state as shown in FIG. 6c, the continuous planar surface of the other side part 7a3 may be used for metering or adjustment relative to a scale on the level rod 70a.

Although the steps of using the fastener 100 in the vertical and horizontal applications have been described in a specific order, a person skilled in the art will appreciate that the order of the steps may be changed as appropriate, such as e.g. attaching the fastener 100 to the fastening object 70 prior to mounting of the second object 50, adjustment of the orientation of the second section 4b of the mounting part relative to the body part 7 after mounting of the second object 50 or after attaching the fastener 100 to the fastening object 70 etc.

The fastener 100 may comprise at least one marker 20 to indicate an application state of the fastener 100. Preferably, a first marker 20a is provided at the body part and a second marker 20b is provided at the mounting part 4. The first marker 20a and/or the second marker 20b may be provided in plural. Examples of such markings are shown in FIGS. 6 to 9. In FIGS. 6 and 7, markers 20 are provided in form of a circle (second marker 20b1 provided at the mounting part 4) to be aligned with an arrow (first marker 20ah, 20av provided at the body part 7). The first marker 20ah, 20av in form of the arrow indicates the application state of the fastener 100 and to which fastening object 70 the fastener 100 is referenced to. In FIGS. 6 and 7, two first markers 20*ah*, 20*av* are provided at the body part 7, one first marker 20*ah* for the horizontal application state and another first marker 20*av* for the vertical application state, and two second markers 20*b*1 are correspondingly provided at respective positions at the mounting part 4. The first marker 20*ah* extends from the bottom part 7*a*2 to one side part 7*a*3 (the side part 7*a*3 comprising the cut-out section 7*x* in FIG. 7*d*), and the first marker 20*av* extends from the bottom part 7*a*2 to the opposite side part 7*a*3 (the side part 7*a*3 comprising the continuous planar surface in FIG. 6*c*). That is, the first markers 20*ah*, 20*av* are pointing to functionally differently designed faces, i.e. either pointing to the side part 7*a*3 comprising the cut-out section 7*x* or pointing to the side part 7*a*3 without a cut-out section. In the vertical application state as shown in FIG. 6*c*, the marker 20*av* points to and is referenced to the level rod 70*a*, and in the horizontal application state as shown in FIGS. 7*c* and 7*d*, the marker 20*ah* points to and is referenced to the batter board 70*b*. Thus, in the exemplary vertical application, the arrow 20*av* may point to the level rod 70*a* at a position, at which the altitude of a laser beam to be detected by an electronic device such as a laser receiver, as an example of the second object 50, is read off (see FIG. 6*c*). Also, in the exemplary horizontal application, the arrow 20*ah* may point to the batter board 70*b* at a position, at which the nail 7*x*1 for attaching a string is driven into the batter board 70*b* (see FIGS. 7*b*, 7*c*).

Figure 9B:
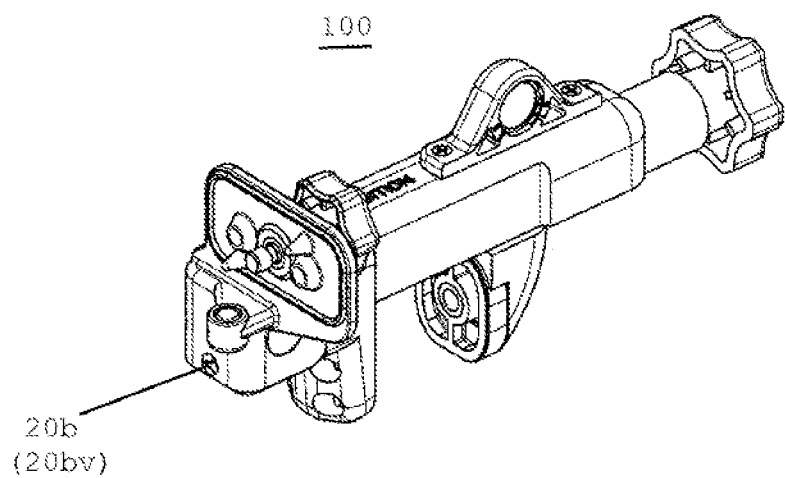
Figure 9C:
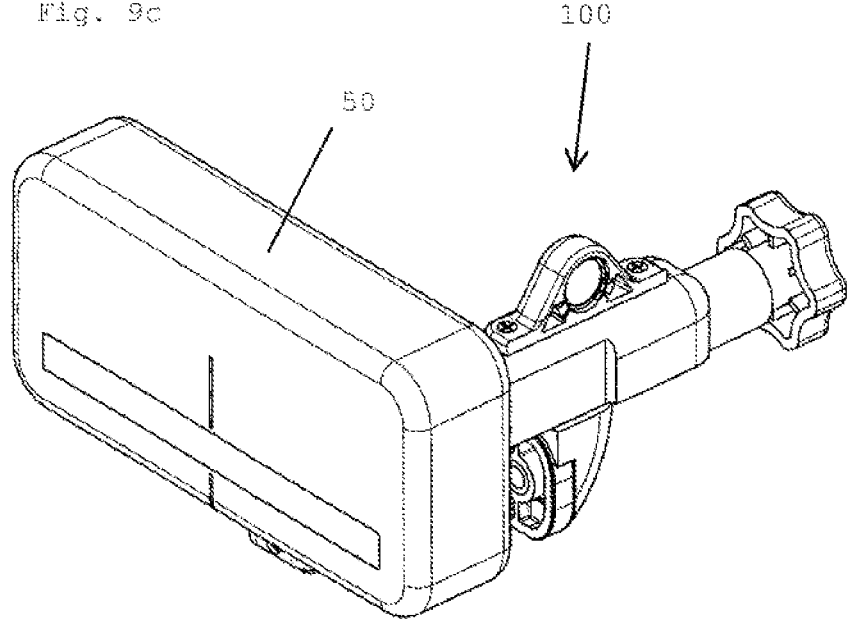

In FIGS. 8 and 9 alternative markers 20 are shown. FIG. 8 shows the vertical application of the fastener 100, wherein FIG. 8*a* is a graph of the fastener 100 as such and FIG. 8*b* is a graph of the fastener 100 with the second object 50 mounted thereto, similar to the graphs in FIGS. 6*a* and 6*b*. Further, FIG. 9 shows the horizontal application of the fastener 100, wherein FIGS. 9*a* and 9*b* are graphs of the fastener 100 as such as seen from different perspectives and FIG. 9*c* is a graph of the fastener 100 with the second object 50 mounted thereto, similar to the graphs in FIGS. 7*a* and 7*b*.

In FIG. 8 and FIG. 9, a single first marker 20*a* (20*a*1) is provided at the body part 7, and two second markers 20*b* (20*bh*, 20*bv*) are provided at distinct positions of the circumference of the mounting part 4, one second marker 20*bh* indicative of the horizontal application state and another second marker 20*bv* indicative of the vertical application state. The first marker 20*a*1 may be provided at the first end 7A at the bottom part 7*a*2 of the body part 7. In FIGS. 8 and 9, the first marker 20*a*1 is exemplary shown in form of a circle. Further, each of the second markers 20*bh*, 20*bv* may be provided as a letter indicative of the respective application state of the fastener 100, i.e. letter "V" for the vertical application (see FIG. 8, second marker 20*bv*) and letter "H" for the horizontal application (see FIG. 9, second marker 20*bh*). The respective second marker 20*bh*, 20*bv* positioned adjacent the single first marker 20*a*1 indicates the respective application state, i.e. letter "V" for the vertical application in FIG. 8*a* (second marker 20*bv*) and letter "H" for the horizontal application in FIG. 9*a* (second marker 20*bh*). The second marker 20*bh*, 20*bv* on the circumference of the second section 4*b* of the mounting part 4, which is not positioned adjacent the first marker 20*a*1, does not indicate the current application state, but other generally possible orientations/application states. For instance, in FIG. 9, the fastener 100 is adjusted to be suitable for the horizontal application and, thus, the second marker 20*bh* with the letter "H", indicative of the horizontal application, is positioned adjacent the first marker 20*a*1 (see FIG. 9*a*). As shown in FIG. 9*b*, although also the further second marker 20*bv* with the letter "V" is provided on the second section 4*b* of the mounting part 4, this second marker 20*bv* is not provided adjacent the first marker 20*a*1 and, thus, is not indicative of the current application state. While the first markers 20*ah*, 20*av* in FIGS. 6 and 7 in form of the arrow also indicate to which fastening object 70 (e.g. level rod 70*a*, batter board 70*b*) the fastener 100 is referenced to by pointing to the respective side part 7*a*3 either with or without the cut-out section 7*x*, the marker 20*a*1 in FIGS. 8 and 9 is not referenced to the respective fastening object 70. That is, the marker 20*a*1 in FIGS. 8 and 9 does not extend and point to either one of the side parts 7*a*3, but is provided only at the bottom part 7*a*2. Because of the second markers 20*bh*, 20*bv*, which are provided in form of a letter indicative of the respective application state of the fastener 100 and indicating the current application state by being respectively positioned adjacent to the first marker 20*a*1, the markers 20 (20*a*1, 20*bh*, 20*bv*) nevertheless allow for an easy positioning of the mounting part 4 relative to the body part 7 in the intended predetermined orientation, and the intended application state, such as horizontal or vertical, can be adjusted at a glance.

However, the provision of markers 20 is not limited to the specific embodiments shown in FIGS. 6-9 and may be amended as appropriate. As markings, different symbols may be used such as circles or squares, numbers or roman numerals (see FIG. 4), and/or written out descriptions such as "position" (see e.g. FIGS. 8, 9). Markings may be also provided without letters, e.g. in form of lines, arrows or other graphical means.

Although in the embodiments described above, there is mainly described the example of the application of the fastener of the present disclosure as a fastener for an electronic device in levelling and aligning applications, this is not a limitation. The fastener according to the present disclosure can also be applied to mechanical or optical devices as well as other devices or structural elements, including, but not limited to, rods, bars, boards, tubes, beams, supports, struts, etc. Generally, the fastener of the present disclosure is applicable to all objects that have to be fixed somewhere and require different orientations. In this regard, it is not mandatory for the mounting part to be suitable for mounting of a device. It is also contemplated that the fastener may serve as an intermediate part, to which a structural element may be attached. Such an application of the fastener of the present disclosure may for instance be useful in scaffolding or laboratory set-ups/facilities in the chemical industry or chemistry/physics lessons. Also, a device may be indirectly mounted to the fastener by being mounted to a structural element as the second object, which in turn is attached to the fastener. If structural elements are to be mounted as the second object, it may be advantageous for the means for mounting the second object to comprise clamping means such as clamps, cramps, and clips. Thus, the fastener of the present disclosure provides the possibility of connecting structural elements with each other or with objects or devices in different orientations in the room, while being capable freely choosing the direction of orientation of the respective objects relative to each other. That is, in case of a cube-shaped mounting part as in the mounting part 4 of the fastener 100 of a preferred embodiment of the present disclosure, the direction of orientation of the respective objects relative to each other may be freely chosen in direction of the axes of Cartesian coordinates x, y, z.

While the invention herein disclosed has been described by way of specific embodiments, numerous modifications and variations could be made thereto by those skilled in the art without departing from the scope and spirit of the invention set forth in the claims.

The invention claimed is:

1. A fastener comprising:
a body part having a first end, a second end opposite to the first end in a longitudinal direction of the body part, and a main body section, extending between the first and second ends in the longitudinal direction of the body part;
a fixed member provided adjacent to the first end of the body part;
a movable member operable to move towards the fixed member to clamp a first object between the fixed member and the movable member;
a mount operable to secure a second object to the fastener, the mount including a first section operable to mount the second object and a second section, the mount operable to rotate and/or pivot relative to the body part to assume a predetermined orientation relative to the body part, the body part retractable from the mount;
a connector operable to secure the body part and the mount at the first end of the body part, the connector including a first connecting member extending from the second section of the mount to the body part in the longitudinal direction and a second connecting member attached to the second section of the mount and extending in a direction transverse to the longitudinal direction, wherein the first connecting member is rotatably fitted in the second connecting member, and the second section of the mount is rotatably fitted to the second connecting member; and
a handle attached to the first connecting member at the second end of the body part, the handle operable to rotate the first connecting member for selectively moving the movable member towards and away from the fixed member,
wherein,
the first connecting member extends from the second section of the mount to the second end of the body part,
the first connecting member includes an external thread operable to engage with an internal thread of the movable member,
the fastener is adjustable between at least two operational states,
the at least two operational states include a first operational state and a second operational state,
the first operational state is when the body part and the mount are adjacent to each other and the predetermined orientation of the mount relative to the body part is fixed, or
the second operational state is when the body part is retracted from the mount so the body part and the mount are spaced apart from each other, and
the predetermined orientation of the mount relative to the body part is adjustable by rotating and/or pivoting the mount.

2. The fastener according to claim 1,
wherein the predetermined orientation of the mount relative to the body part is fixed via a positive connection and/or a non-positive connection between the mount and the body part.

3. The fastener according to claim 2,
wherein,
when the predetermined orientation is fixed via the positive connection, the second section of the mount has at least one protruding edge and the first end of the body part has at least one mating recess, and/or
when the predetermined orientation is fixed via the non-positive connection, an elastic member is operable to bias the body part toward the mount.

4. The fastener according to claim 1, wherein the predetermined orientation of the mount relative to the body part is adjustable in predefined discrete positions.

5. The fastener according to claim 1, further comprising:
an abutment provided at the main body section of the body part.

6. The fastener according to claim 1, further comprising:
at least one marker provided at the mount and/or the body part.

7. A laser receiver for levelling and aligning applications, comprising a fastener, wherein the fastener is the fastener according to claim 1.

8. A fastener comprising:
a body part having a first end, a second end, and a main body section extending between the first end and the second end along a longitudinal direction of the body part, the main body section including a fixed member;
a movable member operable to move towards the fixed member to clamp a first object between the fixed member and the movable member;
a mount operable to secure a second object to the fastener;
a connector operable to secure the body part and the mount at the first end of the body part, the connector including a connecting member extending in the longitudinal direction, the connecting member including an external thread operable to engage an internal thread of the movable member;
a handle attached to the connector at the second end of the body part, the handle operable to rotate the connector relative to the movable and fixed members to cause the movable member to move towards the fixed member or away from the fixed member and;
a biasing member extending in the longitudinal direction and operable to permit an orientation of the body part relative to the mount to be changed when the biasing member is actuated.

9. The fastener according to claim 8,
wherein,
the biasing member is operable to bias the body part towards the mount, and
the predetermined orientation of the mount relative to the body part is fixed via a positive connection and/or a non-positive connection between the mount and the body part.

10. The fastener according to claim 9,
wherein,
when the predetermined orientation is fixed via the positive connection, a section of the mount has at least one protruding edge and the first end of the body part has at least one mating recess.

11. The fastener according to claim 8, wherein the mount is adjustably fixed relative to the body part via predefined discrete positions.

12. The fastener according to claim 8, further comprising:
an abutment provided at the main body section of the body part.

13. The fastener according to claim 8, further comprising:
at least one marker provided at the mount and/or the body part.

14. The fastener according to claim 8, wherein the fixed member is provided adjacent the first end of the body part.

15. The fastener according to claim 8,
wherein,
the mount includes a first section operable to mount the second object and a second section to which the connector is attached,
the connector includes another connecting member attached to the second section of the mount and extending in a direction transverse to the longitudinal direction, and
the connecting member is rotatably fitted in the another connecting member, and
the second section of the mount is rotatably fitted to the another connecting member.

16. The fastener according to claim 15,
wherein,
the fixed member is provided adjacent to the first end of the body part,
the connecting member extends from the second section of the mount to the second end of the body part, and
the handle is attached to the connecting member and operable to rotate the connecting member for moving the movable member towards and away from the fixed member.

17. A laser receiver for levelling and aligning applications, comprising a fastener, wherein the fastener is the fastener according to claim 8.

18. The fastener according to claim 8, further comprising:
an alignment section extending in the longitudinal direction on at least one side of the body part, the alignment section operable to allow a user to align the fastener relative to an external object.

19. The fastener according to claim 8,
wherein,
the orientation of the body part relative to the mount is operable to be changed when the biasing member is compressed.

* * * * *